(12) United States Patent
Ghai

(10) Patent No.: US 11,350,212 B2
(45) Date of Patent: May 31, 2022

(54) METHOD AND SYSTEM FOR LOCATING THE ORIGIN OF AN AUDIO SIGNAL WITHIN A DEFINED SPACE

(71) Applicant: BARCO N.V., Kortrijk (BE)

(72) Inventor: Vikrant Ghai, Delhi (IN)

(73) Assignee: BARCO N.V., Kortrijk (BE)

( * ) Notice: Subject to any disclaimer, the term of this patent is extended or adjusted under 35 U.S.C. 154(b) by 189 days.

(21) Appl. No.: 16/770,965

(22) PCT Filed: Dec. 12, 2018

(86) PCT No.: PCT/EP2018/084560
§ 371 (c)(1),
(2) Date: Jun. 9, 2020

(87) PCT Pub. No.: WO2019/115612
PCT Pub. Date: Jun. 20, 2019

(65) Prior Publication Data
US 2021/0168501 A1   Jun. 3, 2021

(30) Foreign Application Priority Data
Dec. 14, 2017   (IN) .............................. 201711044969

(51) Int. Cl.
*H04R 3/00*   (2006.01)
*G01S 3/808*   (2006.01)
(Continued)

(52) U.S. Cl.
CPC ............ *H04R 3/005* (2013.01); *G01S 3/8083* (2013.01); *G10L 15/06* (2013.01); *H04R 1/406* (2013.01);
(Continued)

(58) Field of Classification Search
None
See application file for complete search history.

(56) References Cited

U.S. PATENT DOCUMENTS

| | | | |
|---|---|---|---|
| 2002/0150263 A1 | 10/2002 | Rajan | |
| 2006/0098534 A1 | 5/2006 | Hickling | |
| (Continued) | | | |

FOREIGN PATENT DOCUMENTS

| | | |
|---|---|---|
| CN | 101438259 A | 5/2009 |
| CN | 104205790 A | 12/2014 |
| (Continued) | | |

OTHER PUBLICATIONS

K.V. Mardia, Statistics of Directional Data, Academic Press Inc. (London) Ltd., 1972, pp. 1-4.
(Continued)

*Primary Examiner* — Paul W Huber
(74) *Attorney, Agent, or Firm* — Hamre, Schumann, Mueller & Larson, P.C.

(57) ABSTRACT

A method and system for identifying a sensor node located closest to the origin of an audio signal. There can be at least three sensor nodes connected to a computational node, and each sensor node includes an audio directional sensor and a device for providing a reference direction. The sensor nodes can receive the audio signal and each audio directional sensor can provide an angle of propagation of the audio signal relative to the reference direction. The angular mean of the measured angles of propagation from all sensor nodes is calculated and the sensor node providing the angle which is closest to the angular mean is defined as the sensor node being closest to the origin of the audio signal.

20 Claims, 5 Drawing Sheets

(51) Int. Cl.
*G10L 15/06* (2013.01)
*H04R 1/40* (2006.01)
*H04R 29/00* (2006.01)

(52) U.S. Cl.
CPC ....... *H04R 29/005* (2013.01); *H04R 2410/05* (2013.01)

(56) References Cited

U.S. PATENT DOCUMENTS

| | | |
|---|---|---|
| 2015/0156578 A1 | 6/2015 | Alexandridis et al. |
| 2016/0352992 A1 | 12/2016 | Saika et al. |
| 2017/0289341 A1 | 10/2017 | Rodriguez et al. |
| 2018/0213309 A1* | 7/2018 | Laitinen ................. H04R 1/406 |
| 2019/0230436 A1* | 7/2019 | Tsingos ..................... G01S 5/20 |

FOREIGN PATENT DOCUMENTS

| | | |
|---|---|---|
| CN | 104254818 A | 12/2014 |
| CN | 104412542 A | 3/2015 |
| CN | 105184214 A | 12/2015 |
| CN | 105572637 A | 5/2016 |
| CN | 105891741 A | 8/2016 |
| CN | 106125048 A | 11/2016 |
| CN | 106663120 A | 5/2017 |
| CN | 106932087 A | 7/2017 |
| CN | 106950542 A | 7/2017 |
| CN | 106997038 A | 8/2017 |
| CN | 107302738 A | 10/2017 |
| CN | 107333120 A | 11/2017 |
| CN | 107437063 A | 12/2017 |
| EP | 2701405 A2 | 2/2014 |
| JP | 201639398 A | 3/2016 |
| JP | 201642613 A | 3/2016 |
| WO | 2007084121 A1 | 7/2007 |

OTHER PUBLICATIONS

International Search Report and Written Opinion in corresponding PCT/EP2018/084560 dated Mar. 20, 2019.
Second Written Opinion in corresponding PCT/EP2018/084560 dated Nov. 6, 2019.
International Preliminary Report on Patentability in corresponding PCT/EP2018/084560 dated Feb. 4, 2020.
Chinese Office Action in corresponding Chinese Application No. 201880079809.4, dated Mar. 15, 2021.

* cited by examiner

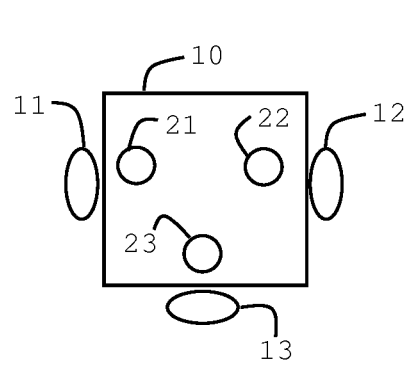 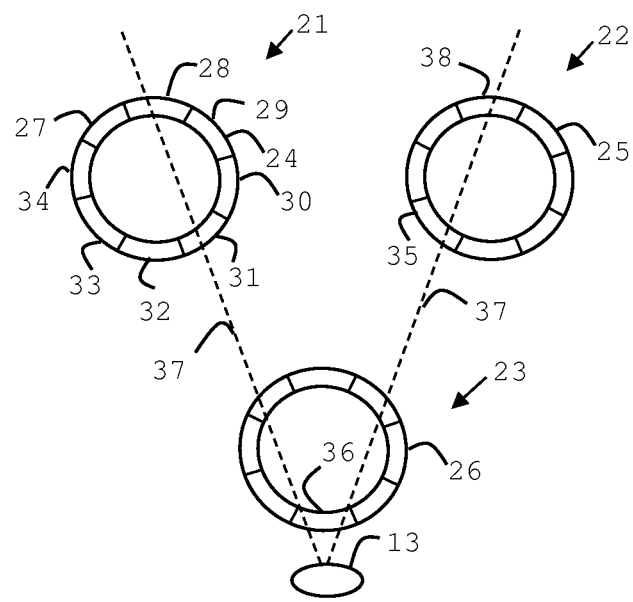
Figure 1 A)                    Figure 1 B)
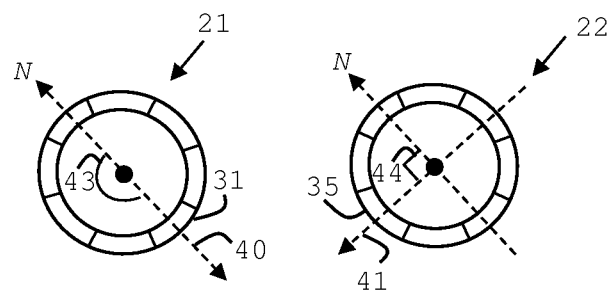
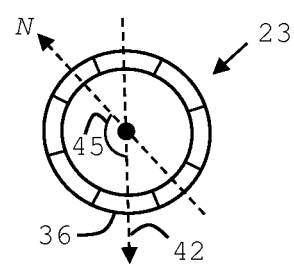
Figure 2

METHOD AND SYSTEM FOR LOCATING THE ORIGIN OF AN AUDIO SIGNAL WITHIN A DEFINED SPACE

The present invention relates to systems and methods for identifying the origin of an audio signal during a meeting involving a plurality of participants.

BACKGROUND

It can be advantageous to differentiate and identify users that speak in a meeting. Many conventional methods are based on biometric input, such as e.g. voice- or face recognition. For example, the user may need to declare his presence and identity, e.g. by saying: "Hi, I'm user X". Some solutions are based on that users have to connect portable equipment to a reference device that keeps track of the portable equipment location in a meeting room.

SUMMARY OF THE INVENTION

The present invention provides means for differentiating and identifying devices that can be associated with users in a meeting. The invention can be used to identify a user as soon as he/she starts talking.

In one embodiment of the present invention there is provided a computer based method for identifying a sensor node located closest to an audio source within a system, said system comprising at least three sensor nodes connected to a computational node, each sensor node further comprising an audio directional sensor for measuring a direction of an audio signal emitted by the audio source. Said method comprises the steps of measuring a reference direction in each sensor node, retrieving a direction of the audio signal from each audio directional sensor of the sensor node with respect to the reference direction, measuring a node angle for each sensor node, the node angle being the angle between the reference direction and the direction of the audio signal propagating from the audio source, calculating the angular mean of all node angles, identifying the sensor node located closest to the audio source as the sensor node having the node angle which is closest to the angular mean of all node angles.

This has the advantage that when an person close to a sensor node starts talking, the system can identify the sensor node that is closest to the origin of the person's voice.

Additionally, the method can comprise the step of connecting the computational node and/or the sensor node to a memory device, said memory device comprising a local, remote or distributed database and storing user and/or device identification and further comprising the step of receiving user and/or device identification. This has the advantage that the identity of a speaking person can be obtained as soon as the person starts talking. E.g. he/she does not have to e.g. explicitly say his/her name to start the identification process.

Additionally, the method can comprise providing time stamps when the same audio signal is received by different audio directional sensors and defining the sensor node located closest to the audio signal as the sensor node having the node angle which is closest to the angular mean of all node angles, as well as having the first time stamp.

Additionally, the method can comprise recording the audio signal, identifying the sensor node located closest to the audio signal, and performing an automatic transcript of the audio signal with means for performing an automatic transcript of an audio signal, and registering the identified sensor node with the transcript. In this way the invention can make it possible to obtain automatic meeting note generation without the persons speaking first having to identify themselves. Additionally the method can comprise registering the automatic transcript with a received user identification.

This has the advantage of providing the ability to automatically generate meeting transcripts and indications of who is saying what, without the speaking person first having to identify themselves.

Additionally or alternatively, the method can comprise generating a graphical time-lapse representation of the meeting room and indicating which node is closest to the audio signal at which point in time.

This has the advantage of enhancing a recording of a meeting so that a graphical representation of who is speaking can be provided, e.g. indicating where at the meeting table the person is located.

Additionally or alternatively, the method can comprise for each audio signal corresponding to a selected sensor node, adding audio directional characteristics corresponding to the location of said selected sensor node in the room.

This has the advantage of providing the ability to create an enhanced audio experience where the origin of a captured audio signal can be made to match the location of the source of said audio signal in a corresponding video capture.

Additionally or alternatively, the method can comprise using noice cancellation in the sensor nodes that are not being identified as the selected sensor node.

This has the advantage of providing improved sound quality at the selected sensor node.

Additionally, the method can comprise that the reference direction is the magnetic north. Additionally or alternatively, the method can comprise that all the sensor nodes and audio sources are located in a confined space, and the fixed reference is a beacon located at a known position within the confined space.

Additionally, the means for providing a reference direction can be a magnet or a satellite global positioning system.

In another embociment of the present invention there is provided a system for identifying a sensor node located closest to an audio source, said system comprising at least three sensor nodes connected to a computational node. Each sensor node can comprise an audio directional sensor configured to receive an audio signal emitted by the audio source and to measure a direction of the audio signal, and each sensor node can be configured to cooperate with means for providing a reference direction such that when an audio signal is received by each sensor node of the system, the angle between said reference direction and said measured direction is a node angle of the sensor node. The system can be configured to identify the selected sensor node as the sensor node having the node angle whose value is the closest to the angular mean of all node angles.

This has the advantage that when a person associated with a sensor node starts talking, the system can identify from which sensor node his/her voice origins.

Additionally the system can comprise that the computational node is implemented in a sensor node.

This allows the calculations to take place in one of the sensor nodes.

Additionally, the system can comprise that each of at least three sensor nodes is implemented in an electronic device being registered with a user.

This has the advantage that the directional sensor can be implemented in a device that is typically brought to a meeting and that will stay close to the user. This can for example be a mobile phone, a tablet, a laptop, etc.

Additionally or alternatively, the system can comprise that each of at least two sensor nodes is implemented in an electronic device being registered to a user and one sensor node is implemented in an electronic device not being registered to any user. This can for example be a laptop camera or a room camera.

This allows a sensor node to be registered with a resource of the room where the resource may not be associated with a user.

Additionally or alternatively, the system can comprise that each of at least two sensor nodes is implemented in an electronic device being registered to a user and one sensor node is implemented in an electronic device not being registered to any user and solely supporting the sensor node with power supply and means for communicating with the computational node.

This has the advantage of enabling the invention with only two sensor nodes that are registered to users by providing a third (dummy) sensor node.

Additionally or alternatively, the system can comprise voice pitch recognition.

This has the advantage that the mean angle method can initially be used together with voice pitch recognition until the system has been sufficiently trained.

Additionally or alternatively, the system can comprise a local, remote or distributed database implemented on a memory device and storing user and/or device identification, and wherein the computational node further has means for connecting to said memory device, the computational node, and/or a sensor node. further being configured to connect to the memory device and receiving user and/or device identification.

This has the advantage that the identity of a speaking person can be obtained as soon as the person starts talking. E.g. he/she does not have to e.g. explicitly say his/her name to start the identification process.

Additionally or alternatively, the system can comprise that the audio directional sensors comprises means for providing time stamps for when the same audio signals is received by the different audio directional sensors.

This can provide security enhancement for defining which node is closest to the audio signal.

Additionally or alternatively, the system can comprise means for recording an audio signal and means for performing automatic transcript of the audio signal.

In this way it is possible to obtain automatic transcript generation without the persons speaking first having to identify themselves.

Additionally or alternatively, the system can comprise means for generating a graphical time-lapse representation of the meeting room and the location of the sensor nodes therein.

This has the advantage of enhancing a recording of a meeting so that a graphical representation of who is speaking can be provided, e.g. indicating where at the meeting table the person is located.

Additionally or alternatively, the system can comprise means for providing a directional characteristics to an audio signal.

This has the advantage of providing the ability to create an enhanced audio experience where the origin of a captured audio signal can be made to match the location of the source of said audio signal in a corresponding video capture.

Additionally or alternatively, the system can comprise that the means for providing a reference direction is a magnet or a satellite global positioning system.

Additionally or alternatively, the system can comprise a computational node for carrying out the method of the present invention.

BRIEF DESCRIPTION OF DRAWINGS

These and other technical aspects and advantages of embodiments of the present invention will now be described in more detail with reference to the accompanying drawings, in which:

FIG. 1A) shows meeting participants around a meeting table and FIG. 1B) shows of an embodiment of the present invention comprising audio directional sensors.

FIG. 2 shows of an embodiment of the present invention comprising audio directional sensors and the magnetic north.

DETAILED DESCRIPTION OF THE INVENTION

Figure 3:
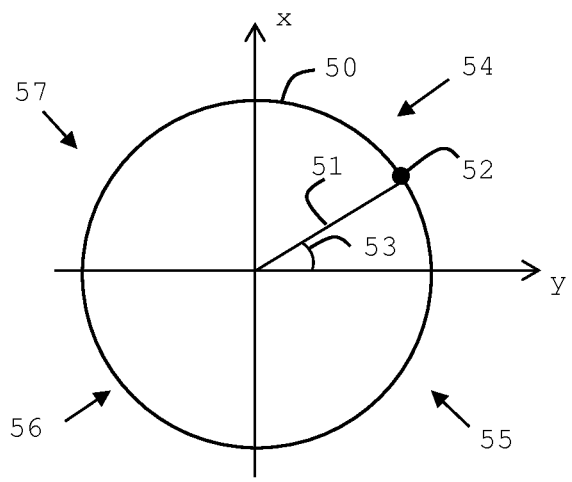
FIG. 3 illustrates angular geometry.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

A "sensor node" can comprise a reference point for a sensor; if there is a plurality of sensors, there can be a sensor node for each sensor (for example audio sensors, magnetic sensors, infrared sensors). The sensor node can be implemented in an electronic device that additionally can have means for connecting to other electronic equipment (such as network devices, displays, mobile phones, tablets, laptops, etc). The present invention can determine which sensor node of a minimum of three sensor nodes is closest to an audio source. A sensor node can be an electronic device and a sensor node further can be associated to a person. A sensor node can also be associated to an object, such as a meeting room for example.

A "computational node" can comprise a reference point for a resource that comprises computational power (to e.g. perform calculations or other processing). The computational node can also have networking abilities for connecting to local or external networks. A local network can e.g. reside within a meeting room or a facility, while an external network can comprise a link to a cloud server at any location. A computational node can coincide with electronic equipment that also houses a sensor node, but it can also be placed in other electronic equipment which does not comprise a sensor node, or it can be a combination of the two.

An audio source can be a person speaking or a device transmitting audio signals, e.g. a loudspeaker.

An "audio directional sensor" (ADS) is an audio sensor which can retrieve the direction of propagation of an audio signal. It can comprise a multiple of audio sub-sensors, such as microphones, which are distributed on a substrate in different locations so that each audio sensor can receive the same audio signal in all or a subset of the different sub-sensors. The sub-sensors can for example be placed in the same plane along the rim of a circle, and when an audio signal is received, the audio directional sensor will return an indication of which sub-sensor(s) that was/where activated. The activation can further comprise e.g. time differentiation or signal strength, in order to also give a propagation direction of the received audio signal. Additionally, there can be a visible signal provided with the returned direction to indicate which sub-sensor (or group of sub-sensors) is activated. In embodiments of the present invention, an audio directional sensor can be implemented in an electronic device comprising a sensor node. The sensor node can also be a fixed point in the audio directional sensor.

An example of an ADS is the Matrix Creator© developed by Matrix Labs©. It comprises the following components: 8 MEMS Microphone Array (DIY Amazon Echo) distributed on a ring, FPGA (Xilinx Spartan 6), Microcontroller (ARM Cortex M3), a Temperature sensor, an Ultraviolet sensor, a Pressure sensor, a 3D Accelerometer, 3D Gyroscope, a 3D Magnetometer, a Humidity sensor as described and shown on the following web page https://creator.matrix.one/#!/index. It is a development board designed for Raspberry Pi with a FPGA, a microcontroller, sensors like an IMU, temperature, humidity, light sensor, IR, 8 microphone array and 35 LED array. Also it has integrated Z-Wave and ZigBee communications, all to allow novice and expert software developers alike to build hardware applications easily. However, for the invention, all these components are not required. Increasing the number of audio sub-sensors in the ADS increases the resolution as to the measurement on the direction of the audio source. In principle, the minimum number of sub-sensors required is three.

A "means for providing a reference direction" can be for example a magnetometer, a magnetic compass or a MEMS magnetic field sensor, that provides the magnetic north. Alternatively it can be a satellite GPS system. The means for providing a reference direction may be located anywhere in the sensor node.

A "node vector" is a vector having as origin a sensor node, which can be for example the center (or any fixed point) on the audio directional sensor associated to said sensor node and going towards the center of the activated sub-sensor.

A "node angle" is defined as the angle between a reference direction and a specific direction originating from the sensor node, both originating from the same fixed point in the sensor node. The reference direction can be for example a direction towards the magnetic north.

The "angular mean angle" is the mean value of at least two angles in an angular chart (see section Mean angle calculation below). The "selected sensor node" is defined as the sensor node whose node angle is the closest to that of the angular mean angle of all at least three sensor nodes, or the one which is closest to the audio source.

An "electronic device" can be any electronic device suitable to receive an audio directional sensor (ADS) and suitable to be used in a meeting room during a meeting. This can e.g. be a laptop, a mobile phone, a palm pad, a tablet, a stationary computer, a stand-alone display, a ClickSharem device.

A "database server" can be a local server or a server "in the cloud" having a computer memory that stores one or more databases, such as a user-database or a device identification data-base.

FIG. 1 shows meeting participants 11, 12 and 13 placed at a table 10. Each participant 11, 12 and 13 can have an electronic device (or sensor node) 21, 22 and 23 respectively in his/her vicinity. The electronic device can be for example a mobile phone, a tablet, a laptop, or a meeting facilitator such as a ClickSharem™ button. Each electronic device or sensor node can be in this embodiment associated or registered to a participant.

FIG. 1B) shows an embodiment of the present invention comprising an enlarged illustration of the electronic devices 21, 22 and 23 (or sensor nodes). Each electronic device 21, 22 or 23 can be equipped with an audio directional sensor, "ADS", 24, 25 and 26 respectively. Each ADS can have a multiple of sub-sensors, for example, ADS 24 has 8 sub-sensors 27-34. The audio sensors of the ADS in FIG. 1B) can be distributed along the rim of a circle and a direction of a received audio signal can be given relative to a fixed point such as for example the center of the circle. In general, a direction of a received audio signal can be given with respect to any fixed point on the ADS, as long as this point is known. Each electronic device 21, 22 or 23 can also have access to a computational node, e.g. embedded in the device electronics or via a connection to an external device.

If the user 13 speaks and provides a vocal signal 37, it can be detected by one or more sub-sensors of ADSs 21, 22 and 23, for example, the audio signal 37 can be detected by sub-sensors 31, 35 and 36.

The ADS can perform an operation on a multiple of sub-sensor responses to provide a single location of a response signal on the ADS. Such operation can comprise e.g. averaging or ranking. A vector can be defined between a fixed point on the ADS and the location of the response signal. This vector can have a direction towards a reference direction (e.g. the magnetic north). If the ADS is put in a sensor node of the present invention, the vector can be referred to as a node vector and the angle can be referred to as a node angle.

There can be several ways for the audio directional sensors to differentiate the angular direction of the audio signal (e.g. such as that of sub-sensors 31 and 28) and establish the direction of propagation of the audio signal. This is not a prerequisite for the present invention, however it can e.g. be used to improve statistics when deciding which vector node is the closest to the audio source. If the signals of activated sub-sensors 35 and 38 are shown toghether with activated sub-sensors 28 and 31, the distribution of indicated/activated sub-sensors can indicate that the audio signal is propagating from sub-sensor 31 towards sub-sensor 28. If the audio signal would have propagated in the opposite direction, other sub-sensors of sensor node 22 would have been activated.

Additionally or alternatively there can be implementations based on time measurements so that the signal 37 would reach sub-sensor 31 before it reaches sub-sensor 28. Another differentiator can be based on the signal strength, wherein the signal 37 would be weaker in sub-sensor 28 that in sub-sensor 31. In this way the response of each sub-sensor becomes unambigous.

In a preferred embodiment of the present invention, the signals from at least three activated sub-sensors 31, 35, 36, each from a different sensor node 21, 22, 23, can be used to determine their respective direction towards a reference direction (e.g. the magnetic north), e.g. their respective node angles 43, 44, 45, which can be illustrated by their respective node vectors 40, 41, 42. There can be more than one sub-sensor contributing to a node vector. If several subsensors in the same ADS are activated, the ADS can first perform calculations to condense the response into one signal. This can e.g. be done by calculating the angular mean angle ("Statistics of directional data" Mardia, Academic Press 1972, p. 20).

A component of the node vector of the sensor node which is the closest to the audio source, or the "first" sensor node will also be present as a component in the other two node vectors. Hence, the angular mean of all node angles will be weighted towards the direction of the node vector of the "first" sensor node, or the one closest to the audio source. Thus, the angular mean of the node angles of at least three sensor nodes can be used to identify the "first" sensor node.

If only two sensor nodes were used, the angular mean would lie in the mid-point just between the two node angles, and will not provide any differentiation as to the origin of the audio source. Thus, a third sensor node is required for the angular mean calculation as a third sensor node can give a value away from the mid-point. However, it is still possible to identify the sensor node which is the closest to the audio source with two sensor nodes as each sensor node will provide a direction to the audio source, but this would not work by calculating the angular mean of the two node angles.

Hence, the ADS can provide a direction of a received audio signal relative to a fixed point on the ADS, e.g. its center.

FIG. 2 shows an embodiment of the present invention comprising three sensor nodes 21, 22 and 23, comprising the sub-sensors 31, 35 and 36, respectively, which have been activated after having received a signal 37 (shown in FIG. 1B). The sensor nodes 31, 35 and 36 may be implemented in an electronic device and may transmit the received signal to a computational node (see FIG. 7). Node vectors 40, 41 and 42 respectively are drawn from the center of the ADS to the center of the detecting (or activated) sub-sensors 31, 35 and 36. For most cases, the electronic devices comprising the ADSs (or sensor nodes) will be positioned within the same plane, thus two-dimensional vectors are sufficient, however, the invention is not limited thereto and the equations can be extended to three dimensions. The angles 43, 44 and 45 between the node vectors 40, 41 and 42 and the reference direction, here the magnetic north N, respectively, can now be established. All three ADSs (or sensor nodes) can detect the same incoming audio signal 37, hence the sensors of the ADS (or sensor node) closest to the origin of the audio signal 37 can provide the best estimated location of the incoming signal. Since the other ADSs (or sensor nodes) can also receive a component of the signal in this direction, an angular mean of all measured directions by all three ADSs (or sensor nodes) will be closest to the best estimated location of the incoming signal. Hence, by comparing the mean of all measured directions by the ADSs (sensor node) (towards the magnetic north) with the signals from each ADS, the ADS having the node angle closest to the angular mean of all node angles can be defined as the ADS closest to the origin of the signal. In this way it is possible to identify the sensor node located closest to the origin of the audio signal, e.g. a person speaking.

An advantage of the present invention is that the method is per se independent of the distance between an audio source (or a receiver for an audio signal, e.g. a camera) and its related sensor node or a user with its sensor node and the other sensor nodes, since the angular mean will not be affected by this distance, as long as the sensor node and/or the user moves along the bisector of the other two sensor nodes. For example, considering FIG. 2: If sensor node 23 (or the audio source 13 and its associated sensor node 23) is moved further away from the sensor nodes 21 and 22 along the bisector of sensor nodes 21 and 22, e.g. in the direction of vector 42, the node angles 43, 44 on sensor nodes 21 and 22 will change. Hence, the resulting node vectors 40 and 41 will also change.

However, the angular mean will remain the same.

In a real implementation, the audio directional sensor needs to have a sufficient range, this may be 1, 2 or even 10 m. It may also be necessary to make sure the different sensors stay closest to their associated user (or device).

There can be several ways to identify the person who is speaking. In one embodiment according to the present invention, each ADS can be embedded in an electronic device which is listed in a device- and/or user database. The database can be stored on a computer memory on a server. The sensor node can have access to the database(s) and hence obtain appropriate user-device information. In another embodiment of the present invention the method based on calculating the angular mean of node angles can be used during the learning session of a voice pitch recognition method.

Mean Angle Calculation

The analysis of directional data can be made in a rectangular polar coordinate system. FIG. 3 shows a circle 50 having a radius 51 of one unit in length. A point 52 on the circle can be defined by the angle 53 between the radius 51 and the circle 50. The polar coordinates can then be expressed in a Cartesian coordinate system (see "Statistics of directional data" Mardia, Academic Press 1972, p. 20) to finally obtain $$\theta_r = \tan^{-1} \frac{\sin \alpha}{\cos \alpha} \quad (1)$$

The mean angle in the four different quadrants in FIG. 3 can now be calculated using equation (1) and the expressions in Table 1.

TABLE 1

| Formulas for the mean angle | |
|---|---|
| Quadrant | Mean angle |
| 54, Sin+, Cos+ | $\theta_r$ |
| 55, Sin+, Cos− | $180 - \theta_r$ |
| 56, Sin−, Cos− | $180 + \theta_r$ |
| 57, Sin−, Cos∓ | $360 - \theta_r$ |

Figure 4:
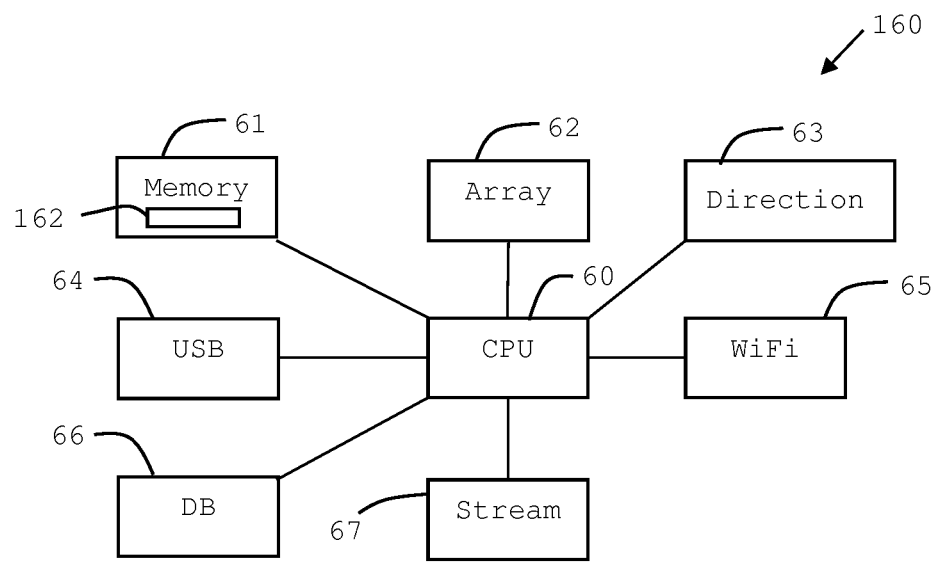
FIG. 4 shows a block diagram of an embodiment of the present invention comprising a sensor node.

FIG. 4 shows a block diagram of an embodiment of the present invention comprising a sensor node 160. The sensor node 160 can have a CPU 60 which can be connected to a computer memory 61 (e.g. a RAM), an audio sensor array 62, means for providing direction 63 (e.g. a magnet or a GPS), a USB module 64 for USB connection, a WiFi module 65 for wireless communication, a database node 66, means for streaming 67, and a magnetic sensor. The audio sensor array 62 can comprise e.g. microphone sensors. The database node 66 can be part of a local, remote or distributed database.

The memory 61 can comprise a buffer 162 wich can store various parameters related to the sensor node, such as related user ID, node angle and the refresh period.

Figure 5:
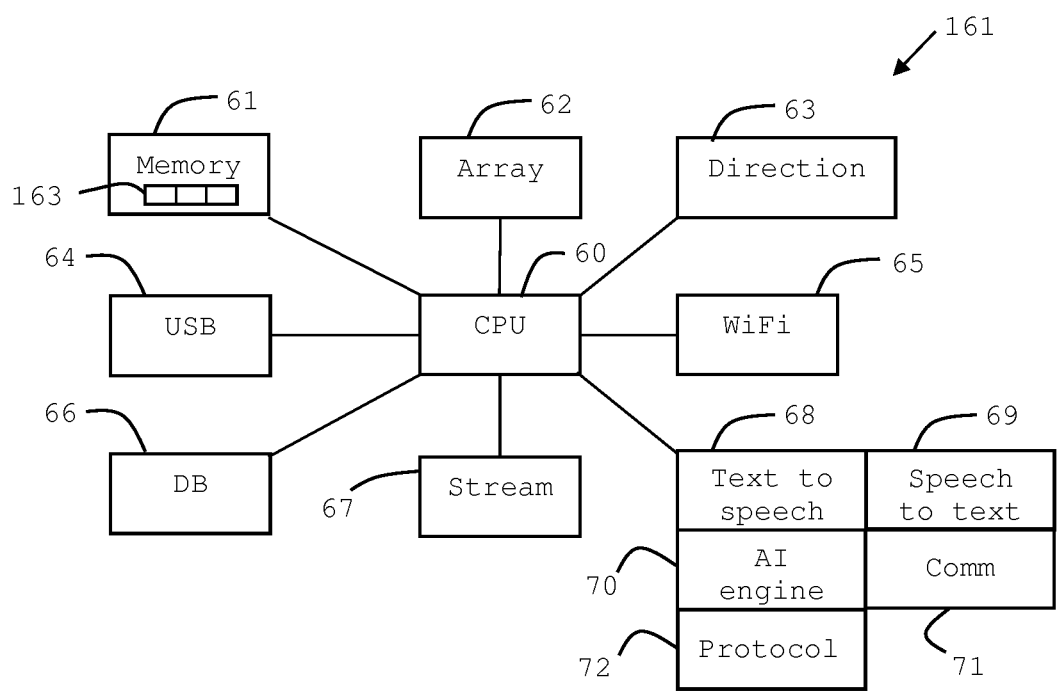
FIG. 5 shows of an embodiment of the present invention comprising a computational node.

FIG. 5 shows a block diagram of an embodiment of the present invention comprising a computational node 161. The computational node 161 may have all features 60 to 67 of a sensor node. There may also be additional processing engines in the computational node 161, for example a text to speech engine 68, a speech to text engine 69, an artificial intelligence engine 70 and a communication node 71. The memory 61 can comprise K buffers 163 for receiving the signal from the sensor node K. This signal can comprise e.g. the audio signal, user ID, node angle and refresh rate. The user ID, node angle and refresch rate can be provided during one refresh period while, in parallel, the audio signal can be continuously streamed as a function of time. When another sensor node is activated (i.e. when a different person starts to speak) the received signal can be directed to another buffer of the K buffers 163.

The computational node receives information from all sensor nodes and can calculate the mean angle and find the selected sensor node. In an additional buffer it can match the audio signal from the currently selected sensor node with the corrensponding user ID and node angle, during each refresh period. Further it can add the output of additional features or engines in the buffer, such as speech to text and artificial intelligence analysis (e.g. using machine learning to make a human-like interpretation of the text content). All streaming can be performed with the means for streaming 67.

Figure 7:
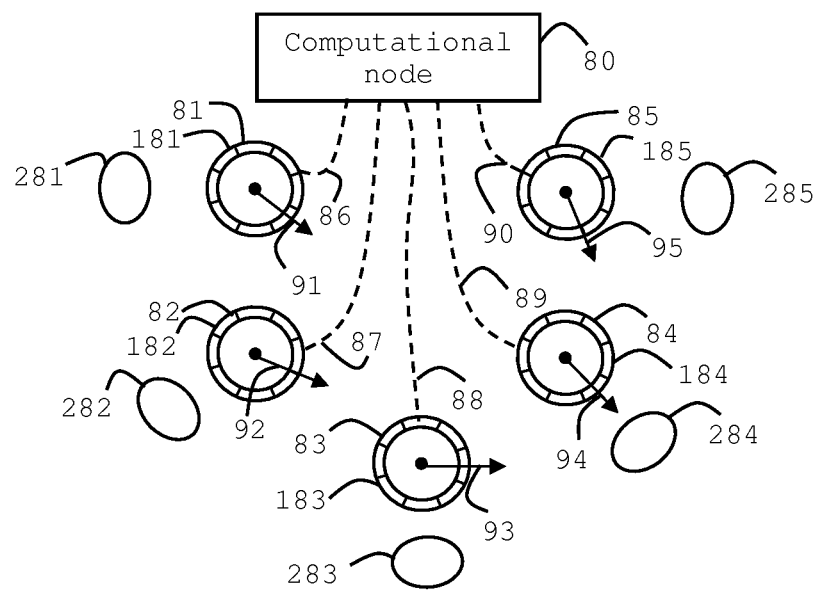
FIG. 7 shows a flow chart of an embodiment of the present invention comprising automatic transcript generation.

FIG. 7 shows an overview of an embodiment of the present invention comprising five sensor nodes 181 to 185 connected to a computational node 80. Each sensor node 181 to 185 is located in close proximity of a user 281 to 285, respectively. Thus, each sensor node is associated to a user. The situation could for example comprise five meeting participants located around a table in a meeting room. If participant 284 is speaking, the local node vectors 91 to 95 of the audio directional sensors 81 to 85, respectively, will be positioned towards participant 284. Each of the sensor nodes 181 to 185 can transfer a signal to the computational node, the signal can comprise e.g. the received audio signal, sensor node ID, the local node vector, user ID, sampling rate, and additional/optional information. The computational node 80 can use the received parameters to calculate the angular mean of the node angles.

Figure 6:
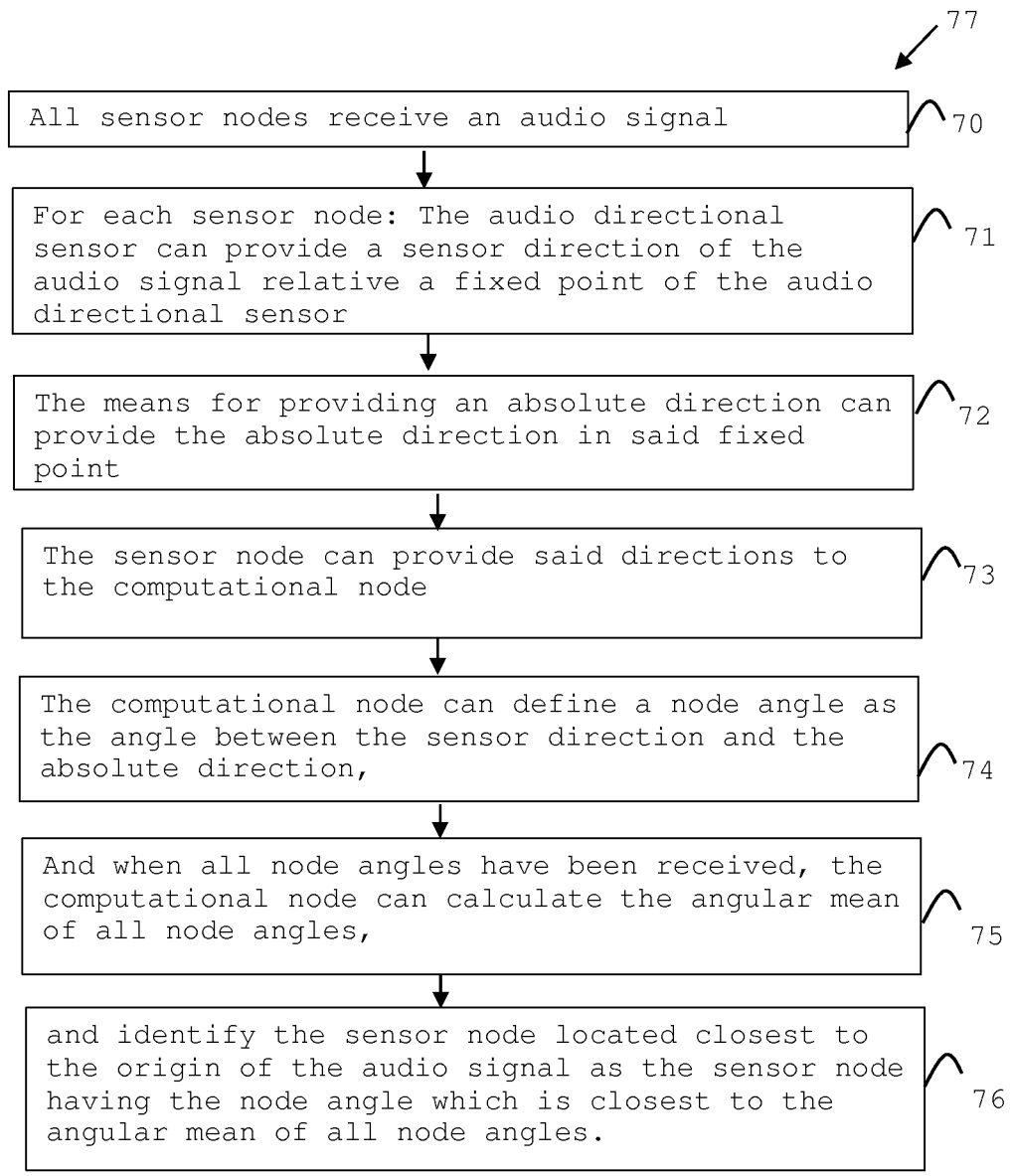
FIG. 6 shows a flow chart of an embodiment of the present invention comprising calculating the mean angle and select the sensor node.

The procedure is illustrated in the flow chart of FIG. 6. In step 70 all sensor nodes receive an audio signal from an audio source, and then in step 71, for each sensor node, the audio directional sensor can provide a sensor direction of the audio source relative to a fixed point of the audio directional sensor. In step 71, the means for providing a reference direction can provide the reference direction in said fixed point. In step 73, the sensor node can provide the above mentioned directions to the computational node, which in step 74 can define a node angle as the angle between the sensor direction and the reference direction. And in step 75, when all node angles have been received, the computational node can calculate the angular mean of all node angles, using the method described above. In step 76 the computational node can identify which of the sensor nodes 181 to 185 that is located closest to the origin of the audio signal. This is done by selecting the sensor node whose node angle is closest to the angular mean of all node angles.

Use Cases

Automatic Transcript Generation

Another embodiment of the present invention comprises automatic transcript generation. The system can identify which person or participant that is speaking within a context location, e.g. a meeting room. FIG. 7 can illustrate this scenario with five sensor nodes 181 to 185 and five participants, 281 to 285 located next to their dedicated sensor node, respectively. Each of the sensor nodes 181 to 185 is associated with one participant's user and comprises an ADS 81 to 85, respectively. Each of the sensor nodes 181 to 185 can be implemented in e.g. a laptop, a smartphone or a tablet or any other device that can provide electronic support. The sensor nodes 181 to 185 can have access to a computational node 80. In the example of FIG. 7, the computational node 80 is external, but one or more sensor nodes could additionally or alternatively have an embedded computational node. In FIG. 7, the ADS's 81 to 85 are connected to a computational node 80 with connections 86 to 90, which may be wireless or with cables.

In the present example, participant 284 is speaking, so for each sensor there is indicated a local node vector 91 to 95, respectively, that points towards the speaking user 284.

When a meeting participant starts speaking, at least one of the sub-sensors of an ADS in at least one sensor node may be activated, as described in FIG. 2 and related text. Thus, the above described method can then be used to calculate the local node angle of each sensor node 181 to 185, with respect to a fixed point relative the ADS 81, e.g. its center. Each sensor node also comprises means for providing a reference direction 63. This may be implemented with e.g. a magnet sensor or with a satellite based GPS system. An embedded or external computational node can then receive the local node angles from all sensor nodes within the context location, and calculate the angular mean of all the node angles. This angular mean value can then be compared with the node angle of each sensor node, and the sensor node whose node angle is closest to the angular mean will be selected as being closest to the speaking participant. This will be referred to as the "selected" sensor node. Each selected sensor node receives the analogue audio signal from the participant 284 and transmits the audio signal to the computational node 80 as formatted voice samples based on a pre-configured refresh rate, for example 1 second or preferably 0.5 seconds (this time period is based on the amount of time required for a person to say something relevant). All sensor nodes also transmit additional data, such as user ID, node angle and refresh period, to the computational node 80. For each refresh period, the computational node 80 performs the necessary calculations in order to determine the selected sensor node. The computational node 80 can then sample the audio signal of the selected sensor node for each specified time period and at the specified refresh rate and append all signals into one stream.

The voice- or audio signal sampling can be collected and appended continuously in the buffer K in the computational node for M number of refresh periods, until the computational node detects that another sensor node is the selected sensor node. The change can be determined by detecting a change in the angular mean angle at the same as the local node angles change. If all local node angles stay substantially the same, a possible variation in the mean angle could be caused by the user slightly altering his/her position.

The collected buffers and voice samples can be fed into a speech-to-text engine 69 which can take the audio signal (which can be binary data) and transform it into textual data. Eventually the end-system can deliver the printed out text, e.g. "Firstname1 Lastname1":Hello Firstname1, How are you? Today we will discuss . . . ". "Firstname2 Lastname2": Hello Firstname2, Fine thanks. Yes, let's start . . . "

Camera

Figure 8:
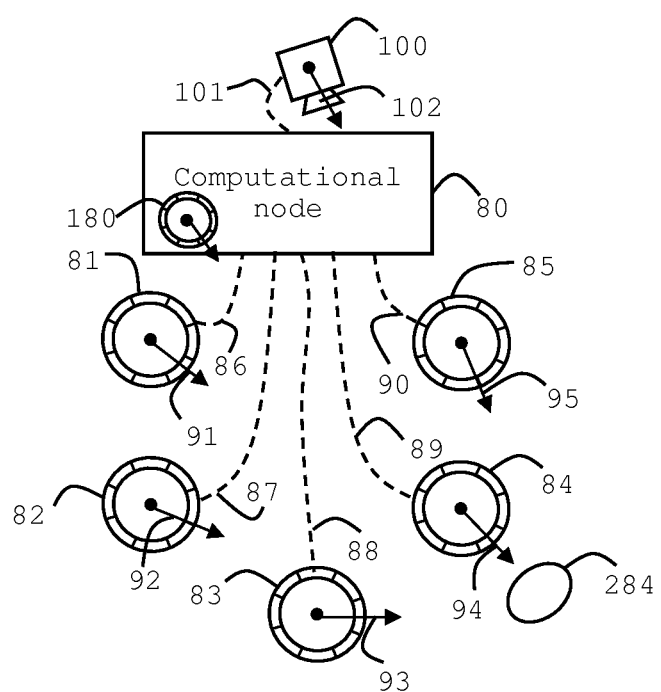
FIG. 8 shows a flow chart of an embodiment of the present invention comprising adaptive steering of a camera.

Additionally or alternatively an ADS can be placed in a device not related or associated to a person, e.g. a room camera. FIG. 8 illustrates the system of FIG. 7 (slightly simplified) where a room camera 100 has been added. The room camera 100 is connected to the computational unit 80 via a wireless or cabled connection 101.

The camera 100 is supported by another sensor node provided in a close proximity to it. For example a sensor node 180, the computational node 80 and the camera 100 can be put in the same physical device, or they can be in separate devices. Since the sensor node 180 will act as a sensor node for the camera, all necessary parameters are present in order to determine the wished orientation of the camera relative to the other sensor nodes. The video capturing quality can be further enhanced by face recognition so that the camera can obtain good focus on the speaking participant. This synchronization between video and audio can improve the user experience in the meeting.

Another embodiment of the present invention comprises a meeting room with at least three sensor nodes and a room camera. The room camera is not associated with an audio directional sensor, but it is connected to electronics that can provide a e reference direction(e.g. magnetic north) and the distance between the camera and each sensor node. Having the node angle of the selected node, reference reference direction, and the distance between the camera and the selected node it is possible to calculate the orientation of the room camera so that it points towards e.g. the selected node.

Another embodiment of the present invention comprises an enhanced meeting recording process where a visual time-lapse representation (e.g. illustration or photographic) of the meeting room and the participants can be created to indicate who is saying what, where he/she was located, and at which time.

Another embodiment of the present invention comprises using the selected node to provide audio directional characteristics that corresponds to the location of said selected node. This can enhance the user experience when attending a recorded meeting event.

Noise Cancellation

Another embodiment of the present invention comprises the implementation of noise cancellation in the sensors other than the selected sensor node. In this way the sound quality can further be enhanced. Only the audio signal or voice of the speaking person is recorded, and the audio signal, including noise, coming from other participants can be filtered out such that they are suppressed or removed. The buffers can be created locally at the sensor nodes 181 to 185, and then streamed to the computational node 80 by the means for streaming 67. The refresh rate can be in the order of a few milliseconds. For example, if someone is murmuring in a meeting room while the main presenter is presenting, this could create noise in the audio signal of the selected sensor node. The audio signals captured from sensor nodes other than that of the selected sensor node can be discarded for final output. Additionally, those audio signals can be used to create negative sound waves for active noise cancellation.

Another embodiment of the present invention comprises using the direct ADS response to provide an additional indication of which electronic device is currently nearest to the audio source. For example, if the audio directional sensors can detect a time difference for when their sub-sensors receive the audio signal, this response can provide the propagation of the audio signal, which can be used to verify the ADS chosen by the mean angle calculations. This can further secure that the correct sensor node is selected.

Another embodiment of the present invention comprises the use of an ADS placed in a dummy device having electronics to support the ADS (e.g. providing power and means for connecting to the computer network). In this way the method based on mean angle calculations can be used in a meeting with only two meeting participants. The two participants can each have a regular electronic device with an ADS, and a third ADS is placed in an arbitrary position, e.g. on the meeting room table. The concept can be extended to three dimensions. If the ADS's do not support time differentiation in their sub-sensors, at least three sensor nodes are necessary in order to arrive at the correct angular mean angle. With two sensor nodes, the audo signal will origin form one of them and the node vectors will be aligned in a plane and their angular average will also lie in the plane (compare with FIG. 2 and the related discussion). Only a third sensor node, preferably out of the plane, would provide a node vector out of the plane, pointing towards sensor node at the origin of the audio signal. This out of plane component will shift the average towards the sensor node at the origin of the audio source.

While the invention has been described hereinabove with reference to specific embodiments, this was done to clarify and not to limit the invention. The skilled person will appreciate that various modifications and different combinations of disclosed features are possible without departing from the scope of the invention.

The invention claimed is:

1. A computer based method for identifying a sensor node located closest to an audio source within a system, said system comprising at least three sensor nodes connected to a computational node, each sensor node further comprising an audio directional sensor for measuring a direction of an audio signal emitted by the audio source, said method comprising the steps of:

measuring a reference direction in each sensor node, retrieving a direction of the audio signal from each audio directional sensor of the sensor node with respect to the reference direction, measuring a node angle for each sensor node, the node angle being the angle between the reference direction and the direction of the audio signal propagating from the audio source, calculating the angular mean of all node angles, identifying the sensor node located closest to the audio source as the sensor node having the node angle which is closest to the angular mean of all node angles.

2. The method according to claim 1, wherein the method further comprises the step of connecting the computational node to a memory device, said memory device comprising a local, remote or distributed database and storing user and/or device identification and further comprising the step of receiving user and/or device identification.

3. The method according to claim 1, wherein the method further comprises the step of connecting the sensor node to a memory device, said memory device comprising a local, remote or distributed database and storing user and/or device identification and further comprises the step of receiving user and/or device identification.

4. The method according to claim 1, further comprising the step of:
providing time stamps when the same audio signal is received by different audio directional sensors,
defining the sensor node located closest to the audio signal as the sensor node having the node angle which is closest to the angular mean of all node angles and having the first time stamp.

5. The method according to claim 1, the method further comprising the steps of:
recording the audio signal,
identifying the sensor node located closest to the audio signal,
performing an automatic transcript of the audio signal with means for performing an automatic transcript of an audio signal, and
registering the identified sensor node with the transcript.

6. The method according to any of claim 5, further comprising the step of registering the automatic transcript with a received user identification.

7. The method according to claim 5, further comprising the step of generating a graphical time-lapse representation of the meeting room indicating which node is closest to the audio signal at which point in time.

8. The method according to claim 7, further comprising the step of, for each audio signal corresponding to a selected sensor node, adding audio directional characteristics corresponding to the location of said selected sensor node in the room.

9. The method according to claim 1, further comprising the step of using noise cancellation in the sensor nodes not being identified as the selected sensor node.

10. The method according to claim 1, wherein the reference direction is the magnetic north.

11. The method according to claim 1, wherein all the sensor nodes and audio sources are located in a confined space, and the fixed reference is a beacon located at a known position within the confined space.

12. The method according to claim 1, wherein the means for providing a reference direction is a magnet or a satellite global positioning system.

13. A system for identifying a sensor node located closest to an audio source, said system comprising at least three sensor nodes connected to a computational node,
each sensor node further comprising an audio directional sensor configured to receive an audio signal emitted by the audio source and to measure a direction of the audio signal,
each sensor node being further configured to cooperate with means for providing a reference direction such that when an audio signal is received by each sensor node of the system, the angle between said reference direction and said measured direction is a node angle of the sensor node,
the system further being configured to identify the selected sensor node as the sensor node having the node angle whose value is the closest to the angular mean of all node angles.

14. The system according to claim 13, wherein the computational node is implemented in a sensor node.

15. The system according to claim 13, wherein each of at least three sensor nodes is implemented in an electronic device being registered with a user.

16. The system according to claim 13, wherein each of at least two sensor nodes is implemented in an electronic device being registered to a user and one sensor node is implemented in an electronic device not being registered to any user.

17. The system according to claim 16, wherein each of at least two sensor nodes is implemented in an electronic device being registered to a user and one sensor node is implemented in an electronic device not being registered to any user and solely supporting the sensor node with power supply and means for communicating with other sensor nodes.

18. The system according to claim 13, further comprising a local, remote or distributed database implemented on a memory device and storing user and/or device identification, and wherein the computational node further has means for connecting to said memory device, the computational node further being configured to connect to the memory device and receiving user and/or device identification.

19. The system according to claim 13, wherein a sensor node further comprises means for connecting to a local, remote or distributed database implemented on a memory device storing user and/or device identification.

20. The system according to claim 13, wherein the audio directional sensors comprises means for providing time stamps for when the same audio signals is received by the different audio directional sensors.

* * * * *